(12) United States Patent
Beyda et al.

(10) Patent No.: US 6,240,426 B1
(45) Date of Patent: May 29, 2001

(54) METHOD AND APPARATUS FOR SYNCHRONIZING INFORMATION BETWEEN A MOBILE DEVICE AND A DATA COLLECTION DEVICE THROUGH A TELEPHONE SWITCHING NETWORK

(75) Inventors: William Joseph Beyda, Cupertino; Shmuel Shaffer, Palo Alto, both of CA (US)

(73) Assignee: Siemens Information & Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/196,627

(22) Filed: Nov. 18, 1998

(51) Int. Cl.[7] .............................. G06F 17/00; G06F 7/00
(52) U.S. Cl. .................................................... 707/201
(58) Field of Search ........................... 707/10, 201

(56) References Cited

U.S. PATENT DOCUMENTS

| | | | |
|---|---|---|---|
| 5,570,412 | * 10/1996 | LeBlanc | 379/58 |
| 5,602,903 | * 2/1997 | LeBlanc et al. | 379/60 |
| 5,768,686 | * 6/1998 | LeBlanc et al. | 455/31.1 |
| 5,799,067 | * 8/1998 | Kikinis et al. | 379/93.06 |
| 5,799,068 | * 8/1998 | Kikinis et al. | 379/93.6 |
| 5,870,765 | * 2/1999 | Bauer et al. | 707/203 |
| 5,974,238 | * 10/1999 | Chase, Jr. | 395/200.78 |
| 5,982,520 | * 11/1999 | Weiser et al. | 359/172 |
| 6,000,000 | * 12/1999 | Hawkins et al. | 707/201 |
| 6,098,076 | * 8/2000 | Rekieta et al. | 707/202 |
| 6,125,369 | * 9/2000 | Wu et al. | 707/201 |
| 6,141,663 | * 10/2000 | Hunkins et al. | 707/201 |

OTHER PUBLICATIONS

"Unix and Pilots," by Kevin L. Flynn, Handheld Systems, Jan./Feb. 1997.
"Unix and Pilots: The Protocol Stack, Part I," by Kevin L. Flynn, Handheld Systems, Mar./Apr. 1997
"Unix and Pilots Part III: The Minimal HotSync," by Kevin L. Flynn, Handheld Systems, May/Jun. 1997.

* cited by examiner

*Primary Examiner*—John Breene
*Assistant Examiner*—Linh Pham

(57) ABSTRACT

A system for connecting a mobile computing device (10) to a remotely located data collection device (20). The system includes a synchronization device (38) that couples the mobile device to a digital telephone (40). The synchronization device operates to convert the data received from the mobile computing device into a format that can be transmitted by the digital telephone. In addition, the synchronization device transmits an identifier that specifies the data collection device to which the data shall be transmitted. The identifier is preferably read by a digital PBX and used to establish a communication path between the data collection device and the mobile computing device.

18 Claims, 6 Drawing Sheets

METHOD AND APPARATUS FOR SYNCHRONIZING INFORMATION BETWEEN A MOBILE DEVICE AND A DATA COLLECTION DEVICE THROUGH A TELEPHONE SWITCHING NETWORK

FIELD OF THE INVENTION

The present invention relates generally to telecommunication systems, and particularly to systems that synchronize information between devices.

BACKGROUND OF THE INVENTION

In recent years, mobile computing devices, such as portable digital assistants (PDAs), have become increasingly popular. These mobile devices are convenient to carry and allow the user to enter information at any desirable location, such as during a meeting, on an airplane, or in a hotel. The entered information is then often sent to a host computer that acts as a data collection device so that others may access it. Both the host computer and the mobile device run corresponding application programs to update each other's information.

This process of updating the information between the mobile device and the host computer is called "synchronization." In general, during synchronization, the remote device and the data collection device use a synchronization protocol to establish a communication path between them. After the communication path is established, a list of programs, sometimes referred to as conduits, are individually executed to update or "synchronize" the information in corresponding programs. Typically, the information to be synchronized resides in a database.

Currently, the synchronization may occur by connecting the mobile device to the data collection device through a modem, a local area network (LAN), or by placing the mobile device in a cradle which is connected directly to the data collection device. For example, FIG. 1 shows a system for synchronizing information that includes a mobile device 10, a cradle 14, and a data collection device 20. The mobile device 10 includes a serial computing port 12 that engages a serial connector port 16 on the cradle 14. The cradle 14 connects to the data collection device 20 by a serial cable 22. Activation of a sync button 18 on the cradle 14 initiates the synchronization process using a vendor-specific protocol that is layered on top of the well-known RS-232 protocol. One disadvantage of this system is that the mobile device 10 must be returned to the cradle 14 before synchronization can occur. Therefore, a user cannot synchronize their data from remote locations in a timely manner. Another disadvantage of this system is that the mobile device 10 expects a dedicated communication path to the data collection device 20. Therefore, synchronization data cannot be routed to a specific data collection device when there are multiple data collection devices available.

Another prior art system for synchronizing a mobile device with a data collection device is shown in FIG. 2. In this system, a modem attachment 24 is connected to the mobile unit 10 by coupling the serial computing port 12 to a serial connector port 16' located on the modem attachment 24. The modem is then connected to a telephone jack. Once connected, data may be transferred over an analog phone line 28 to a modem 26 that is coupled to the data collection device 20. One disadvantage of this system is that the modem attachment 24 typically cannot transmit data through a digital telephone exchange (PBX) that are often used to connect a number of telephones to the public switched telephone network (PSTN). Because these PBXs are becoming more and more widespread in offices and hotels around the world, the locations at which a user can transmit data from their mobile device 10 to the data collection device 20 have been correspondingly limited.

FIG. 3 shows yet another prior art system for synchronizing a mobile device with a data collection device. The system includes an Ethernet-based local area network (LAN) to which one or more data collection devices may be connected. A LAN attachment 30 having a serial connector port 16" is coupled with the serial computing port 12 on the mobile device 10 to allow data to be transferred between the mobile device 10 and one of a number of available data collection devices 20, 20', 20" over the LAN. Some disadvantages of this system include the additional cost of purchasing and installing cables for LAN ports and the additional space that these LAN ports occupy at each location where a user may wish to connect their mobile device in order to synchronize data.

Given the shortcomings in the prior art, there is a need for a system that allows a user to synchronize data between a mobile device at virtually any location through a commonly available digital telephone and PBX.

SUMMARY OF THE INVENTION

The present invention provides a synchronization system for synchronizing a mobile computing device to a data collection device using an existing telephone switching network that may include a digital private branch exchange (PBX). The synchronization system includes a mobile computing device coupled to a synchronization device that receives synchronization data. The synchronization device includes an I/O controller, a buffer, a CPU, and memory. A data collection identifier accessible by the CPU determines the location of a data collection device which is coupled to the synchronization device through the digital telephone switching network. The synchronization device receives the synchronization data from the mobile computing device, buffers the synchronization data, accesses the data collection identifier, inserts the data collection identifier before the buffered data, and outputs the data collection identifier and buffered data to the digital telephone switching network. A PBX then receives the data collection identifier, locates the requested data collection device, and establishes a communication to the data collection device on which the synchronization process occurs.

The synchronization device may include a synchronization detection process that detects whether data at the serial computing port is synchronization data or non-synchronization data. The synchronization device may also include a time-out watcher process that sends stay alive data to the mobile computing device on a predetermined time interval while waiting for the communication path to be established to the data collection device.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention is a system for synchronizing a mobile computing device to a data collection device through an existing digital telephone network that may include a private branch exchange (PBX). For the purpose of the present specification, the term "synchronization" will refer to the process of updating information stored on either the mobile device 10 or on the data collection device 20, which is typically a personal computer or server.

Figure 1:
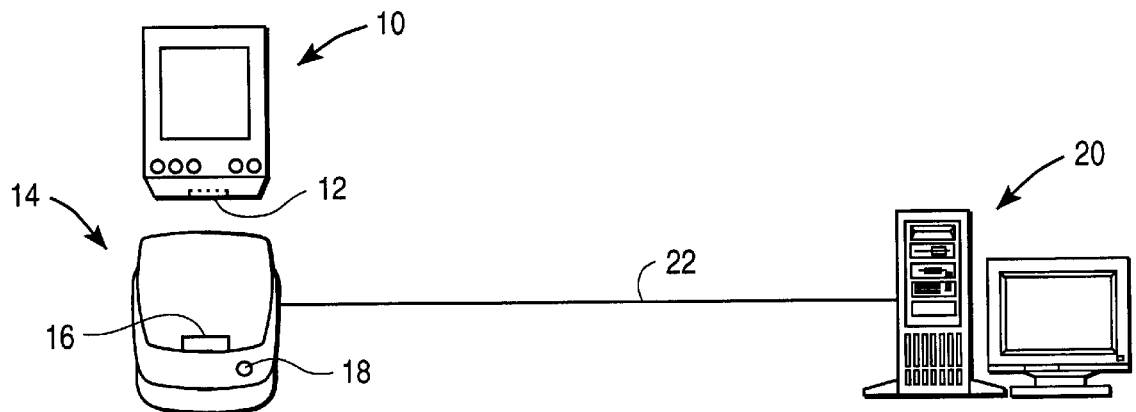
FIG. 1 shows a prior art system for synchronizing a mobile device with a data collection device wherein the mobile device is placed in a cradle that is directly connected to the data collection device.
Figure 2:
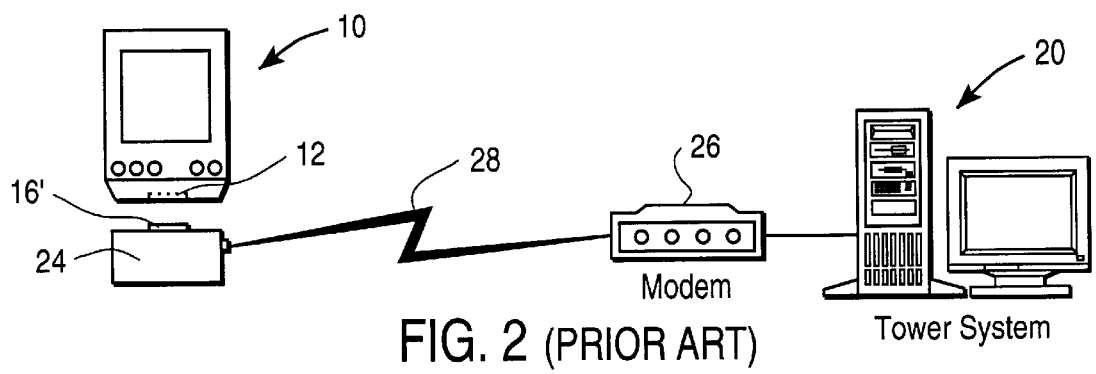
FIG. 2 shows a prior art system for synchronizing a mobile device with a data collection device wherein the mobile device is connected to the data collection device using a modem and an analog phone line.
Figure 3:
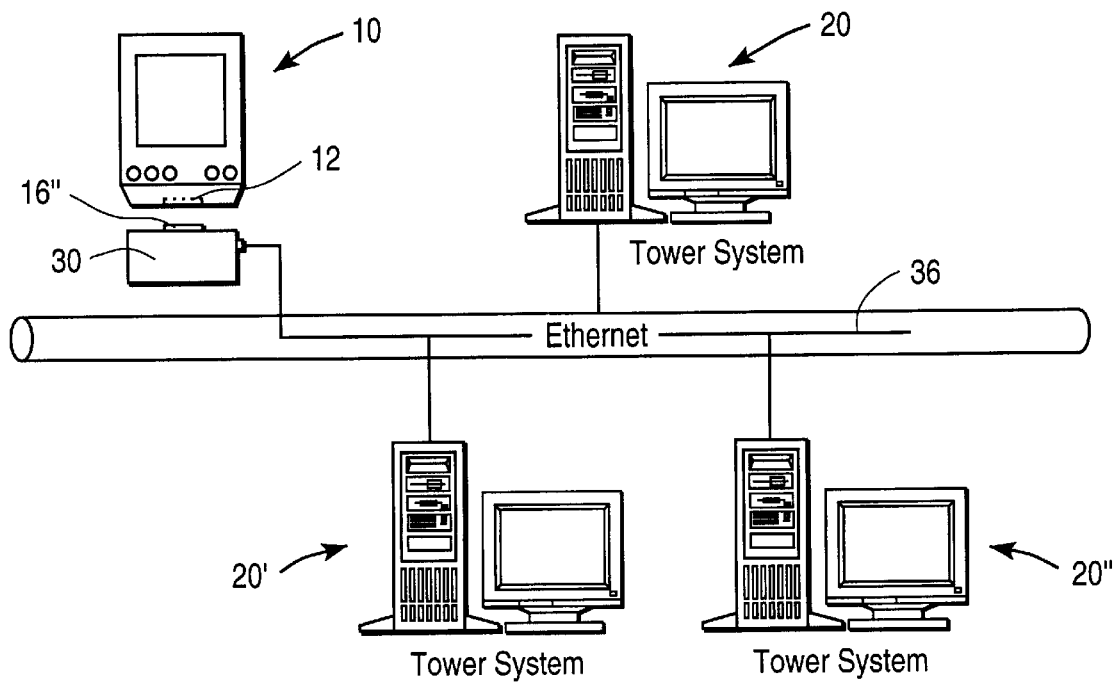
FIG. 3 shows a prior art system for synchronizing a mobile device with a data collection device wherein the mobile device is connected to the data collection device through a local area network.
Figure 4:
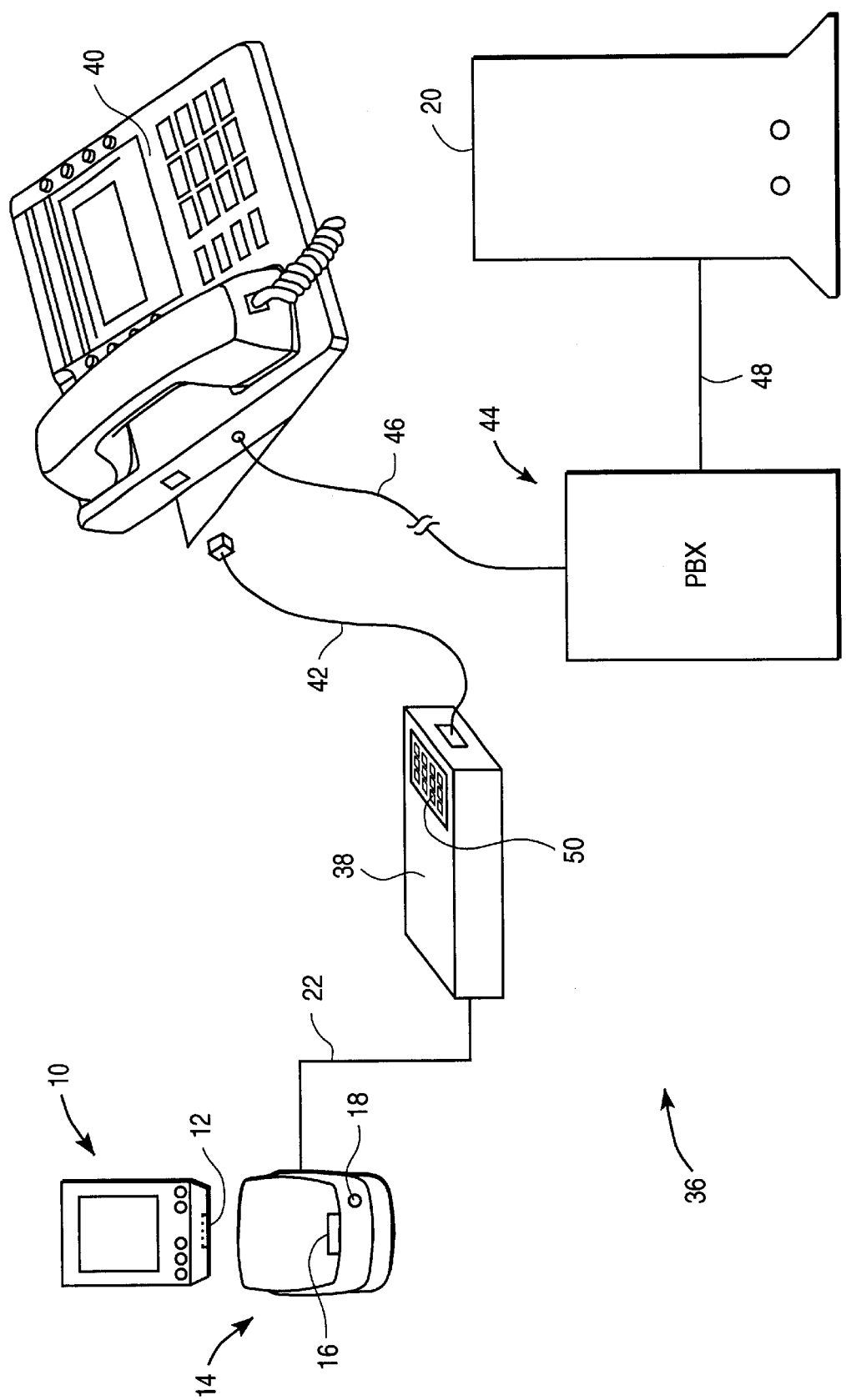
FIG. 4 is a block diagram of a system for transferring data between a mobile device and a data collection device through a digital telephone switching system according to the present invention.

One embodiment of a synchronization system 36 according to the present invention is shown in FIG. 4. The synchronization system 36 includes a mobile computing device 10 that is coupled to a synchronization device 38 through a serial cable 22. The synchronization device 38 is then coupled to a digital telephony device, such as a digital telephone 40, using an adapter cable 42. In the presently preferred embodiment of the invention, the digital telephone 40 is an Optiset™ Symphony™ produced by Siemens and the adapter cable 42 includes a TA-232 connector that interfaces with a port on the telephone. Standard telephone cabling 46 connects the digital phone 40 to a telecommunication network, such as a PBX, as shown generally at 44. The PBX 44 is connected to the data collection device 20 through a communication path 48.

In this synchronization system 36, once the sync button 18 is activated on the cradle 14, a vendor-specific synchronization process that is layered on top of the well-known RS-232 protocol is initiated between the mobile device 10 and the synchronization device 38. As indicated above, it has not been possible to connect a mobile computing device to a remote data collection device through a digital PBX because the mobile computing device: (1) does not always transmit data in a format that is compatible with a digital telephone network; and (2) begins transmitting data as soon as the synchronization button 18 is activated without following a PBX call set-up protocol. A private branch exchange receiving this data has no way to determine the appropriate destination for the data. To eliminate these problems, the synchronization device 38 inserts a data collection identifier or signal before the synchronization data so that the PBX can properly determine the communication path 48 that connects the PBX 44 to the data collection device 20. This data collection identifier may be input into the synchronization device using any identifier entry means, such as a keypad 50 as shown or may be permanently stored in the device in a ROM (not shown) or other such memory. The communication path 48 may be any of several well-known communication paths, such as TCP/IP, that allow the PBX to direct data received from the synchronization device to a particular data collection device 20. During operation, the synchronization device 38 converts the serial data received from the mobile computing device 10 to a format that is readily passed by the telephone 40 to the PBX as well as converting data received from the telephone into a serial format that can be received by the mobile computing device.

As one skilled in the art would recognize, the data collection device 20 need not be a separate device but may reside within the digital PBX 44 by including a program that runs on the digital PBX 44 for synchronizing data. This type of program is well-known in the art. In addition, the serial cable 22 may be adapted to directly couple with the serial computing port 12 on the mobile device 10, thus eliminating the cradle 14 from the system 36. Also, even though a single digital PBX 44 is shown as an illustrative telecommunication network, one skilled in the art would recognize that other telecommunication network configurations could be implemented, such as having a plurality of PBXs connected via T-1 carriers, LANs packet switching networks (PSNs), or frame relay networks.

Figure 5:
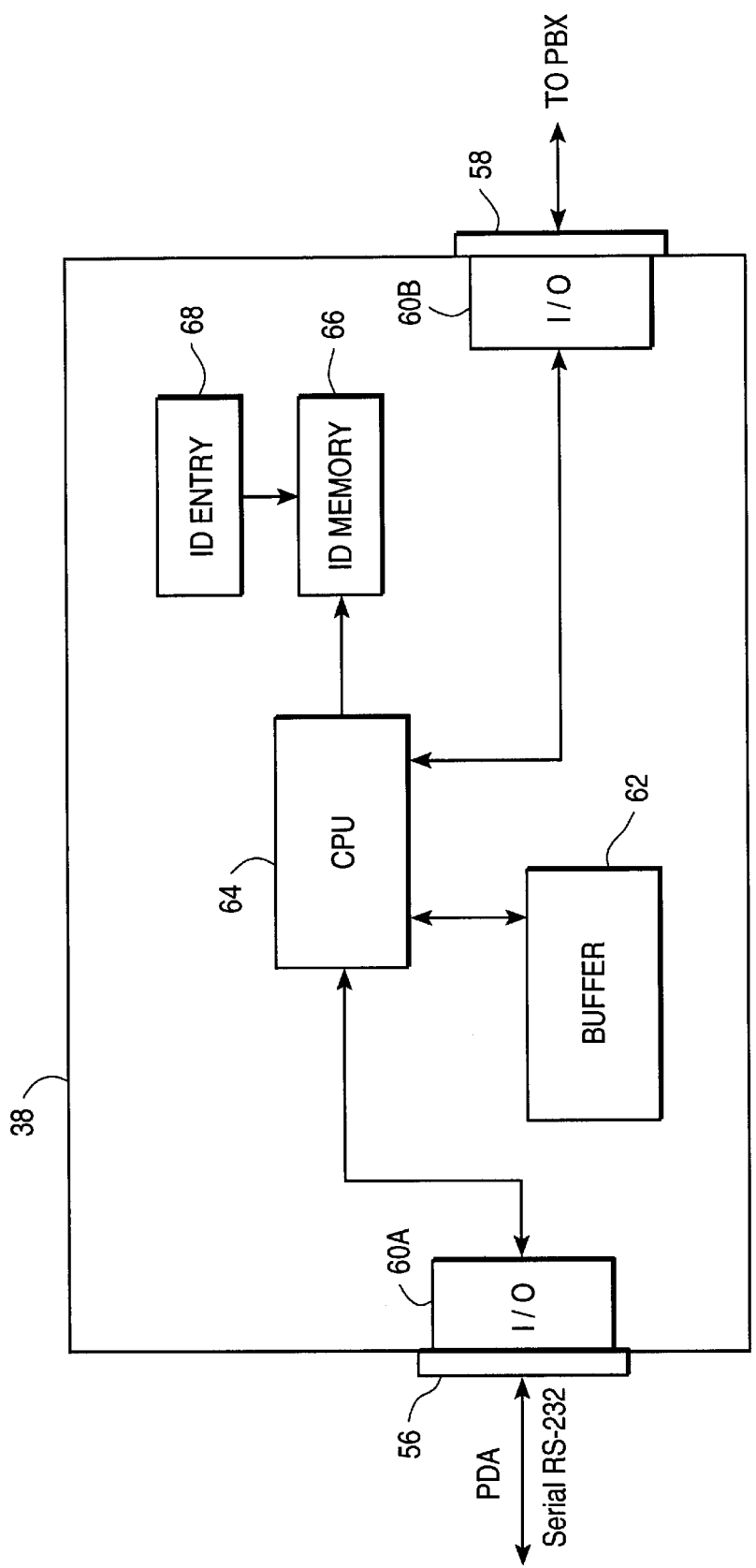
FIG. 5 is a functional block diagram of a synchronization device according to the present invention.

Now referring to FIG. 5, a functional block diagram of a synchronization device 38 according to the present invention is shown. The synchronization device includes two ports: a serial computing port 56 and a phone data port 58, and circuitry that manages the data flow between the two ports. The circuitry includes an input/output (I/O) controller 60A that transmits and receives data from the mobile computing device and an I/O controller 60B that transmits and receives data from the digital telephone.

Controlling the flow of data between the I/O controllers 60A and 60B are a buffer 62, a central processing unit (CPU) 64, and a memory 66 that stores an identification of the particular data collection device to which data from the mobile device is to be directed along with the instructions that controls the steps performed by the synchronization device. The memory 66 is typically a combination of volatile and non-volatile memory well-known in the art. However, if the synchronization device 38 includes a keypad 50 that allows a user to enter the identifier of the data collection device, the memory 66 may be only volatile memory, such as RAM.

In operation, when the CPU 64 detects data available at the I/O controller 60A, the CPU 64 reads the data and stores it in the buffer 62. The CPU 64 then recalls the data collection device identifier from the memory 66 and writes it to the I/O controller 60B. This data collection identifier is detected by the PBX and is used to establish a connection between the telephone 40 and the data collection device. Once the connection has been established, CPU 64 then processes any data between the two I/O controllers 60A, 60B as described in more detail in the flow diagrams of FIGS. 6A–6C. The completion of the synchronization process may be indicated by having the CPU 64 detect specifically formatted termination packets or by a time-out process that resets the CPU after no data is detected at the I/O controllers 60A, 60B for a predetermined length of time.

In another embodiment, upon detection of a signal at the I/O controller 60A, CPU 64 transmits a sync request through the I/O controller 60B, which the PBX (not shown) is programmed to recognize as a synchronization request and to execute instructions to establish the communication path to the data collection device. A preferred method of sending this signal from the mobile computing device is by asserting DTR using the well-known RS-232 protocol. The synchronization device 38 translates this signal into an appropriate request for the digital phone and PBX to recognize.

Figure 6A:
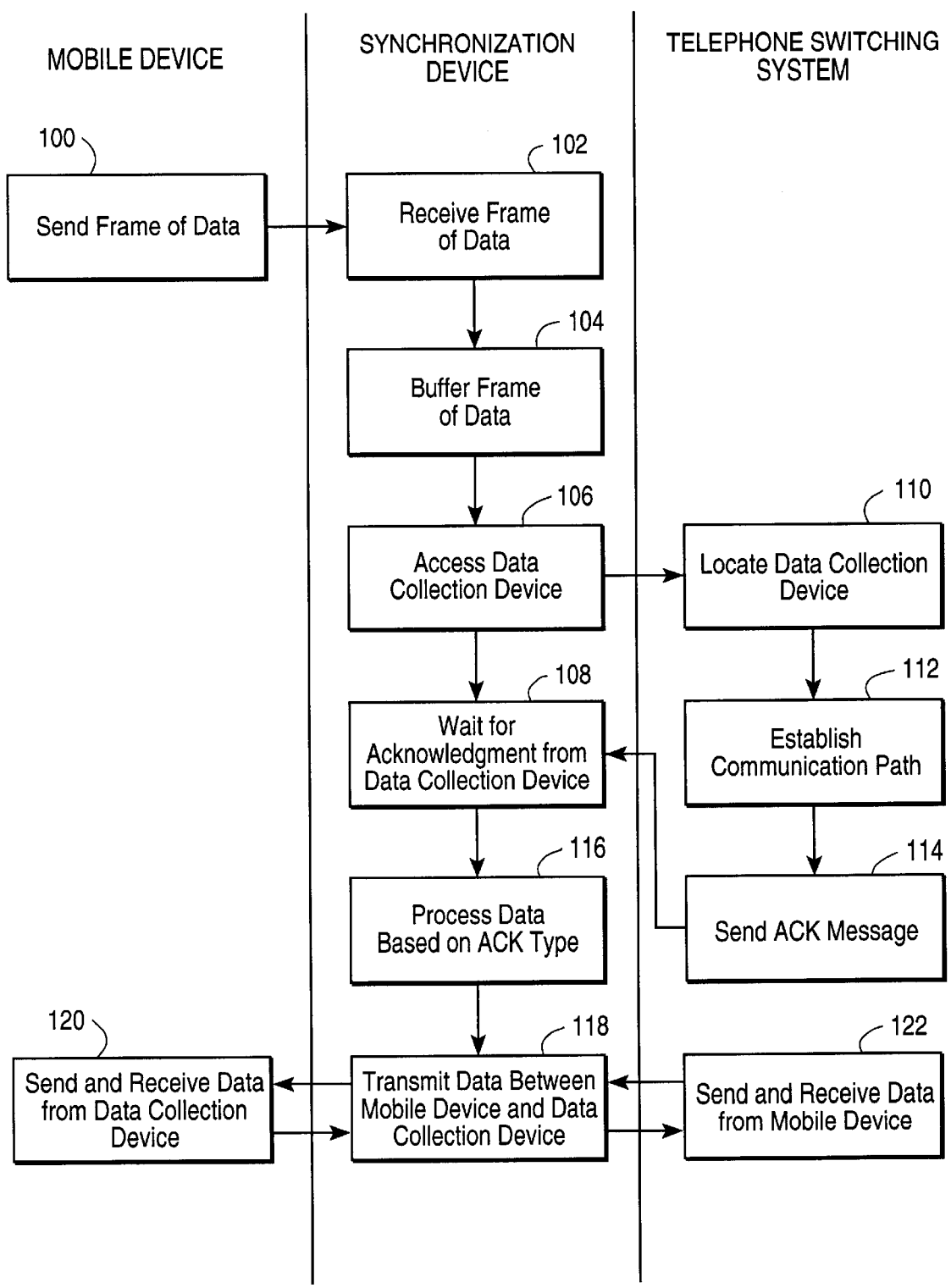
FIG. 6A is a flow diagram of the steps performed by the synchronization device and the digital telephone switching network according to the present invention.
Figure 6B:
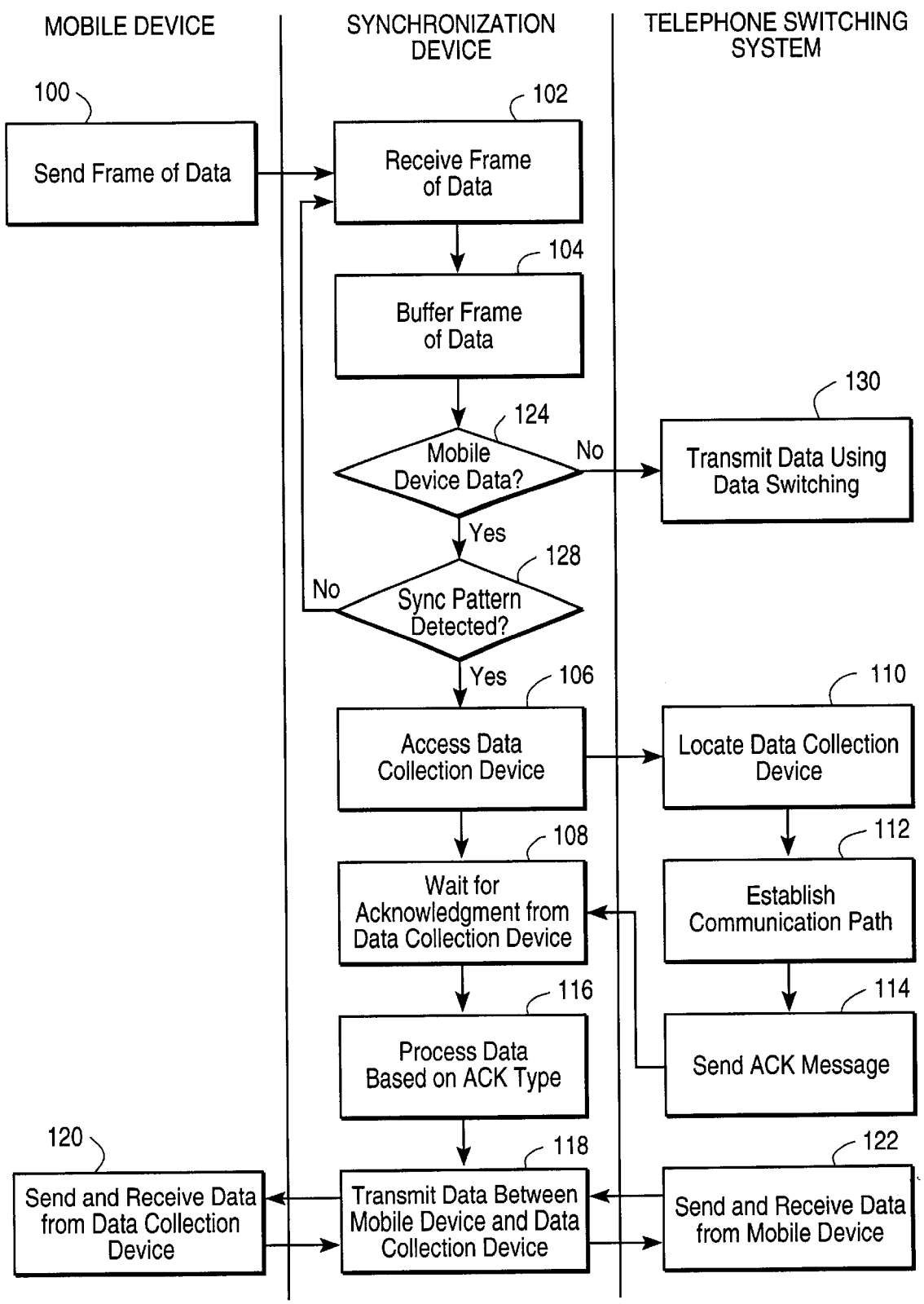
FIG. 6B is a flow diagram of the steps performed by the synchronization device and the telephone switching network that utilizes sync detection according to another aspect of the present invention.
Figure 6C:
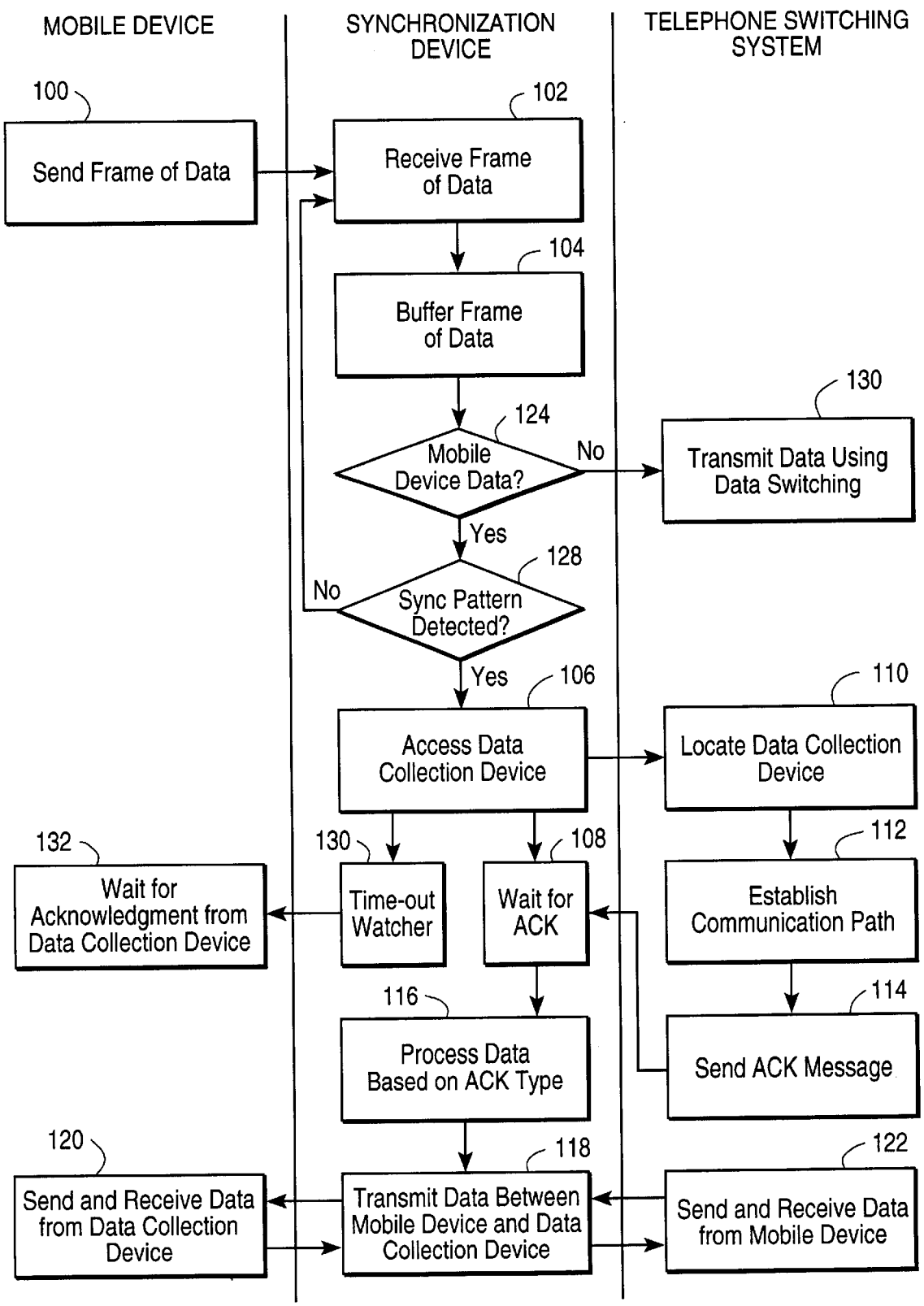
FIG. 6C is a flow diagram of the steps performed according to a third embodiment of the invention that utilizes sync detection and a time-out watcher.

FIGS. 6A–6C show flow diagrams depicting the steps performed by the synchronization device in a telephone switching network according to the several embodiments of the present invention. Because the serial computing port 56 may accept input from either a mobile device or a personal computer, the circuitry will perform differently depending on whether the serial computing port 56 is a dedicated port or a non-dedicated port. In FIG. 6A, a mobile device 10 has a dedicated connection to the serial computing port 56. In FIGS. 6B–6C, the mobile device 10 shares the serial computing port 56 with other serial devices such as a personal computer. Therefore, FIGS. 6B–6C have additional steps that detect whether the data received is synchronization data. The embodiment shown in FIG. 6C also includes additional steps to implement a time-out watcher for configurations in which the data collection device 20 is routed through a complex telecommunication network and a delay of the receipt of the acknowledgment would cause the mobile device 10 to time out.

Referring now to FIG. 6A, there is shown a flow diagram of the steps performed by the synchronization device and the telephone switching network when the mobile device has a dedicated port on the synchronization device. The mobile device will send a frame of data, shown in block 100, to the synchronization device. The synchronization device will receive the frame of data, block 102, and buffer the frame of data at block 104. After buffering the frame of data, the synchronization device will send a message to the telephone switching network to access the data collection device, at block 106. As mentioned previously, if there is only one data collection device available, the mobile computing device may assert a DTR signal which the synchronization device translates to a sync request format that the digital phone and PBX will recognize as a synchronization request and establish a communication path with the data collection device as programmed into the PBX using well known methods. Alternatively, the message may be sent by transmitting a data collection identifier that informs the PBX that data following is to be directed to a particular data collection device. Once the message has been sent, the synchronization device then waits for an acknowledgment, at block 108.

While the synchronization device waits for an acknowledgment, the telephone switching network locates the data collection device, at block 110, and establishes a communication path, at block 112, to the data collection device. Blocks 110 and 112 may be implemented by using a database that has an entry for the data collection device and an entry for the communication path type. As previously stated, the communication path type may be one of several well-known communication paths, such as TCP/IP. After the telephone switching network has established a communication path to the data collection device, the data collection device sends an acknowledge message through the telephone switching network to the synchronization device, as represented by block 114. Based on the acknowledgment type, the CPU in the synchronization device will process the data, shown in block 116. The synchronization device through instructions executed on the CPU transmits the data between the mobile device and the data collection device, represented by blocks 120, 118, and 122, by performing the appropriate formatting changes so that the data can be understood by the mobile computing device or transmitted over the digital telephone link to the PBX.

Referring now to FIG. 6B, there is shown a flow diagram of the steps performed by the synchronization device and the telephone switching network of a second embodiment showing the sync detection aspect of the present invention. As stated earlier, in this embodiment, the mobile device does not have a dedicated port on the synchronization device but rather shares a port with other serial computing devices. Therefore, after the synchronization device has buffered the data at block 104, the synchronization device through instructions executed in the CPU compares the buffer data to various vendor-specific synchronization data formats, shown in decision block 124. One of such formats is HotSynch™ by Palm Computing. For this format implementation, the synchronization-type data may include a loopback test packet or a wakeup packet. If it is not synchronization-type data, the CPU 64 assumes that it is not connected to a mobile computing device for which an address of the desired data collection device must be transmitted. Therefore, the data is transmitted using data switching at block 130. In these situations, the synchronization device processes the data between both of its ports without any additional decision making or processing.

However, if the data detected at block 124 is synchronization-type data, the data is checked to see if it is a valid wakeup packet at block 128. If it is not, the processing returns to block 102 and waits to receive another frame of data and then proceeds through the same steps as described above. Once the buffer data is a valid wakeup packet, the process proceeds to block 106 and proceeds to process the data as described in FIG. 6A.

FIG. 6C includes all the steps shown in FIG. 6B in addition to steps for implementing a time-out watcher according to another aspect of the present invention. In this embodiment, the data is processed similarly as shown in FIG. 6B until the synchronization device has detected a valid wakeup packet at decision block 128. Once a valid wakeup packet has been detected, the synchronization device sends a message to the telephone switching network to access the data collection device at block 106, and also sets a time-out watcher, shown at block 130. While the synchronization device waits for an acknowledgment from the data collection device, the time-out watcher will cause the CPU to send stay-alive packets to the mobile device at predetermined intervals while waiting for an acknowledgment, represented by block 132. The stay-alive packets keep the mobile device from aborting the synchronization process. These stay-alive packets may be necessary if the telephone switching network is a complex network and the period for transmitting the appropriate acknowledgment signal exceeds the time allowed by the mobile device. After an acknowledgment message has been received by the synchronization device, the time-out watcher is stopped and the process proceeds to block 116 and proceeds to process the data as described in FIG. 6B.

As one skilled in the art would recognize, the functionality of the synchronization device could be implemented within the mobile computing device by using its own resources, such as the keypad, the memory, and the serial port connected directly to the digital telephone. In this implementation, the data collection identifier may be inserted into a known position within the synchronization-type packet. Typically, synchronization-type packets have various fields specifying necessary information, such as packet type, length, data rate. These fields and their contents are vendor-specific to the type of mobile computing device being used. For this embodiment, a packet could have another field located with the other fields that would allow a data collection identifier to be inserted in that field. Using fields within data packets to specify needed information is well-known in the art. The PBX or the synchronization device would be programmed to extract the data collection identifier from this field. Using the data collection identifier, the PBX would be able to properly route the synchronization data to the data collection device. In addition, one skilled in the art would recognize that other technology, such as wireless technology, may replace the communication path between the devices.

The embodiments of the invention in which an exclusive property or privilege is claimed are defined as follows:

1. A synchronization device for synchronizing data between a mobile computing device and a data collection device through a telephone switching network, of the type that includes a plurality of digital phones and a private branch exchange (PBX), the synchronization device comprising:

a serial computing port connectable to the mobile computing device through which the mobile computing device and the synchronization device communicate;

a telephone data port connectable to a digital phone through which the synchronization device and the digital phone communicate;

an I/O controller for handling data between the serial computing port and the telephone data port;

a buffer for storing the data received at the serial computing port and the telephone data port;

a processor that is programmed to:

access a data collection identifier for addressing the data collection device upon the detection of data at the serial computing port;

store the data in the buffer as buffered data; and transmit the data collection identifier followed by the buffered data through the telephone data port so that the telephone switching network may, upon receipt of the data collection identifier, locate the desired data collection device and establish a communication path between the mobile computing device and the data collection device.

2. The synchronization device of claim 1, wherein the processor is further programmed to execute a sync detection process that detects whether data at the serial computing port is synchronization data from a mobile computing device or non-synchronization data from a computing device.

3. The synchronization device of claim 1, wherein the processor is further programmed to execute a time-out watcher process that sends stay alive packets to the mobile computing device on pre-determined time intervals while waiting for an acknowledgment packet from the mobile computing device.

4. The synchronization device of claim 1, further comprising an identifier input means that updates the data collection identifier stored in the memory.

5. The synchronization device of claim 4, wherein the identifier input means is a keypad through which the data collection identifier may be entered.

6. The synchronization device of claim 4, wherein the identifier input means is a field in the data from the mobile computing device.

7. A synchronization system for synchronizing data between two devices, the system comprising:

a mobile computing device having an interface;

a synchronization device having a serial computing port, a telephone data port, an I/O controller, a buffer, a processor, and memory;

a telephone switching network comprising a plurality of digital devices and a telecommunication network;

a first connector having one end operationally connected to the mobile device interface and the other end operationally connected to the serial computing port;

a second connector having one end operationally connected to the telephone data port and the other end operationally connected to one of the plurality of digital devices;

a data collection device operably connected to communicate with the telecommunication network;

a data collection identifier accessible by the processor for addressing the data collection device, wherein upon detection of data at the serial computing port, the processor stores the data in the buffer as buffered data, transmits the data collection identifier followed by the buffered data through the telephone data port so that the telephone switching network may, upon receipt of the data collection identifier, locate the desired data collection device and establish a communication path between the mobile computing device and the data collection device.

8. The synchronization system of claim 7, wherein the processor further executes a sync detection process that detects whether data at the serial computing port is synchronization data from a mobile computing device or non-synchronization data from a computing device.

9. The synchronization system of claim 7, wherein the processor further executes a time-out watcher process that sends stay alive data to the mobile computing device on pre-determined time intervals while waiting for an acknowledgment data from the mobile computing device.

10. The synchronization system of claim 7, wherein the synchronization device further comprises an identifier input means that updates the data collection identifier stored in the memory.

11. The synchronization of system of claim 10, wherein the identifier input means is a keypad through which the data collection identifier may be entered.

12. The synchronization system of claim 10, wherein the identifier input means is a field in the synchronization data from the mobile computing device.

13. The synchronization system of claim 7, further comprising a cradle having a connector means coupled to the mobile computing device interface so that the end of the first connector operationally connected to the mobile device interface is through this connector means and an output port so that the other end of the first connector is operationally connected to the serial computing device through this output port.

14. The synchronization system of claim 7, wherein the mobile computing device interface is a serial interface that implements a synchronization protocol layered on top of an EIA-232 protocol for communicating between the mobile device and the synchronization device.

15. The synchronization system of claim 7, wherein the digital device is a digital telephone.

16. The synchronization system of claim 7, wherein the telecommunication network includes a digital PBX.

17. The synchronization system of claim 16, wherein the data collection device is part of the PBX.

18. A method of synchronizing data between a mobile computing device and a data collection device through a telephone network, the telephone network comprising a plurality of digital phones and a digital telephone switch (PBX), the method comprising:

(a) coupling the mobile computing device to one of the plurality of digital phones;

(b) sending synchronization request data through the digital phone to the telecommunication network, the synchronization request data comprising a data collection device identifier and synchronization formatted data;

(c) receiving the data collection device identifier at the PBX;

(d) locating the data collection device indicated by the data collection device identifier;

(e) establishing a communication path to the data collection device;

(f) transferring the synchronization data between the mobile computing device and data collection device.

* * * * *